United States Patent
Curtis et al.

[11] Patent Number: 5,982,757
[45] Date of Patent: Nov. 9, 1999

[54] METHOD AND APPARATUS FOR REGISTERING A REMOTE UNIT IN A COMMUNICATION SYSTEM

[75] Inventors: Rob Glenn Curtis, Lake Zurich; Chad Michael Fors, Hoffman Estates, both of Ill.

[73] Assignee: Motorola, Inc., Schaumburg, Ill.

[21] Appl. No.: 09/086,154

[22] Filed: May 28, 1998

Related U.S. Application Data

[60] Provisional application No. 60/052,386, Jul. 14, 1997.
[51] Int. Cl.⁶ .......................................... H04J 3/14
[52] U.S. Cl. .......................... 370/328; 370/320; 455/435; 455/456
[58] Field of Search ..................................... 370/252, 320, 370/328, 329, 342, 349, 441, 479; 455/434, 435, 456

[56] References Cited

U.S. PATENT DOCUMENTS

| | | | |
|---|---|---|---|
| 4,400,585 | 8/1983 | Kaman et al. | 179/2 EB |
| 5,488,609 | 1/1996 | Hluchyhj et al. | 370/84 |
| 5,548,533 | 8/1996 | Gao et al. | 364/514 |
| 5,655,215 | 8/1997 | Diachina et al. | 455/456 |
| 5,778,316 | 7/1998 | Persson et al. | 455/434 |

*Primary Examiner*—Chau T. Nguyen
*Assistant Examiner*—Shick Hom
*Attorney, Agent, or Firm*—Heather L. Creps

[57] ABSTRACT

The method operates in the remote communication unit, the remote communication unit responsive to a first wireless communication system and to a second wireless communication system, and the method includes receiving a time delay parameter from the first wireless communication system; storing the time delay parameter; and based on the time delay parameter, accessing the second wireless communication system.

12 Claims, 3 Drawing Sheets

METHOD AND APPARATUS FOR REGISTERING A REMOTE UNIT IN A COMMUNICATION SYSTEM

RELATED INVENTIONS

The present invention claims priority from provisional application Ser. No. 60/052,386 "Method and Apparatus for Registering a Remote Unit in a Communication System" filed on Jul. 14, 1997, and assigned to the assignee of the present invention.

FIELD OF THE INVENTION

The present invention relates generally to wireless communication systems and, in particular, registering remote units within such wireless communication systems.

BACKGROUND OF THE INVENTION

Wireless communication systems are known to employ registration methods in which a remote unit (such as a cellular subscriber) is registered with the communication system. In particular, when a remote unit initially accesses a communication system, the remote unit transmits a registration message via a reverse control channel. The registration message contains the remote unit's electronic serial number (ESN) and is utilized for notifying the infrastructure equipment of the location of the remote unit.

Because remote unit registration requires messages to be transmitted over a reverse control channel, simultaneous registration by multiple remote units can easily overload a communication system's reverse control channel. For example, during a cell outage, remote units that were in communication with the cell will simultaneously attempt to register with any underlying communication system, potentially causing an overload of the reverse control channel.

Thus a need exists for a method and apparatus for registering a remote unit in a communication system that overcomes the deficiencies described above.

SUMMARY OF THE INVENTION

The foregoing need is addressed by a method which operates in a remote communication unit, the remote communication unit responsive to a first wireless communication system and to a second wireless communication system, the method including receiving a time delay parameter from the first wireless communication system; storing the time delay parameter; and based on the time delay parameter, accessing the second wireless communication system.

According to another aspect of the present invention, a remote communication unit responsive to a first wireless communication system and to a second wireless communication system includes means for receiving a time delay parameter from the first wireless communication system; means for storing the time delay parameter; and means for accessing the second wireless communication system based on the time delay parameter.

According to a further aspect of the present invention, a method operates in a first network element associated with a first wireless communication system, the first wireless communication system responsive to a plurality of remote communication units and responsive to a second wireless communication system, the method including determining a number of the plurality of remote communication units in communication with the first wireless communication system; based on the number, determining a time delay parameter, the time delay parameter representing an amount of time; and transmitting the time delay parameter to at least some of the plurality of remote communication units.

According to a still further aspect of the present invention, an instruction set is stored on a computer-readable medium which, when loaded into at least one processor, performs a method for registering a plurality of remote communication units, the method including determining a number of the plurality of remote communication units in communication with a first wireless communication system; based on the number, determining a time delay parameter, the time delay parameter representing an amount of time; transmitting the time delay parameter to at least some of the plurality of remote communication units; and based on the time delay parameter and a status of the first wireless communication system, registering at least some of the plurality of remote communication units at the second wireless communication system.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE DRAWINGS

Figure 1:
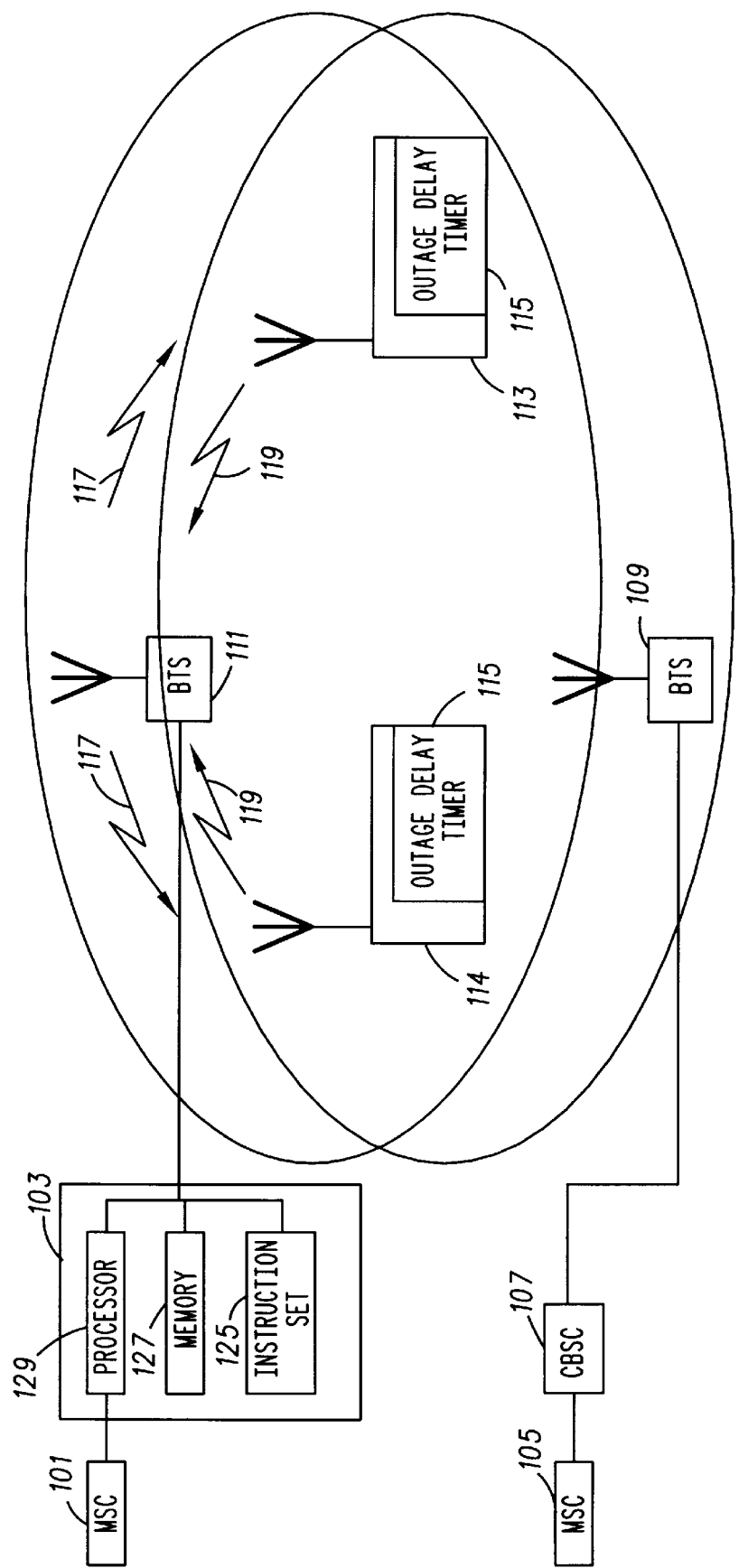
FIG. 1 illustrates multiple wireless communication systems in accordance with the preferred embodiment of the present invention.

FIG. 1 illustrates multiple wireless communication systems in accordance with the preferred embodiment of the present invention. In the preferred embodiment of the present invention, the multiple communication systems include a plurality of network elements and utilize two system protocols, with network elements associated with the first communication system (i.e., base station 111, CBSC 103, and MSC 101) utilizing a first communication system protocol and network elements associated with the second communication system (i.e., base station 109, CBSC 107, and MSC 105) utilizing a second communication system protocol. Each network element is commercially available from a variety of sources, such as Motorola, Inc., and may include, among other things, a processor 129, a memory 127 and an instruction set 125 readable by a computer (discussed further below).

Remote communication units 113 and 114 are dual-mode remote units, capable of communication utilizing both communication system protocols, and may include, among other things, processors, memories and instruction sets. As shown, remote units 113 and 114 are communicating with base station 111 via uplink communication signal 119 and base station 111 is communicating with remote units 113 and 114 via downlink communication signals 117. In the preferred embodiment of the present invention, base stations 109 and 111 are suitably coupled to CBSC 107 and 103, respectively, and CBSCs 107 and 103 are suitably coupled to MSCs 105 and 101, respectively.

As discussed above, base station 111, CBSC 103, and MSC 101 utilize a first communication system protocol, which, in the preferred embodiment of the present invention is a Code Division Multiple Access (CDMA) system protocol as described in Cellular System Remote unit-Base Station Compatibility Standard of the Electronic Industry Association/Telecommunications Industry Association interim standard 95 (TIA/EIA/IS-95A), which is incorporated by reference herein. (EIA/TIA can be contacted at 2001 Pennsylvania Ave. N W Washington D.C. 20006). However, in alternate embodiments of the present invention, base station 111, CBSC 103, and MSC 101 may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Additionally, base station 109, CBSC 107, and MSC 105 utilize a second communication system protocol, which, in the preferred embodiment of the present invention is an AMPS system protocol. However, in alternate embodiments of the present invention, base station 109, CBSC 107, and MSC 105 may utilize any of the aforementioned communication system protocols.

Operation of the communication systems in accordance with the preferred embodiment of the present invention occurs as follows: Base station 111 transmits a time delay parameter, such as a maximum time delay (MAX_OUTAGE_DELAY) to all remote units in communication with base station 111. In the preferred embodiment of the present invention, MAX_OUTAGE_DELAY is broadcast via an overhead message on a CDMA paging channel. As will be discussed below with reference to FIG. 2 and FIG. 3, in the preferred embodiment of the present invention MAX_OUTAGE_DELAY is calculated by base station 111 and is a function of a number of remote units in communication with base station 111. During a cell outage (i.e., base station 111 failing), all remote units that were communicating with base station 111 immediately prior to the outage, will attempt to access base station 109 via a registration message transmitted over a reverse control channel, however unlike prior-art methods of registration, remote units will delay sending a registration message to base station 109 until a random time period (between 0 and MAX_OUTAGE_DELAY) has passed. More particularly, with reference to FIG. 1, remote unit 113 utilizes outage delay timer 115 to calculate a first random time period between 0 and MAX_OUTAGE_DELAY, and remote unit 114 utilizes outage delay timer 115 to calculate a second random time period between 0 and MAX_OUTAGE_DELAY. After the first random time period has passed, remote unit 113 attempts to access base station 109 via a registration message, and after the second random time period has passed, remote unit 114 attempts to access base station 109 via a registration message.

Because each remote unit will not attempt to simultaneously register with base station 109 after a cell outage, the possibility that the reverse control channel will become overloaded is greatly reduced.

Figure 2:
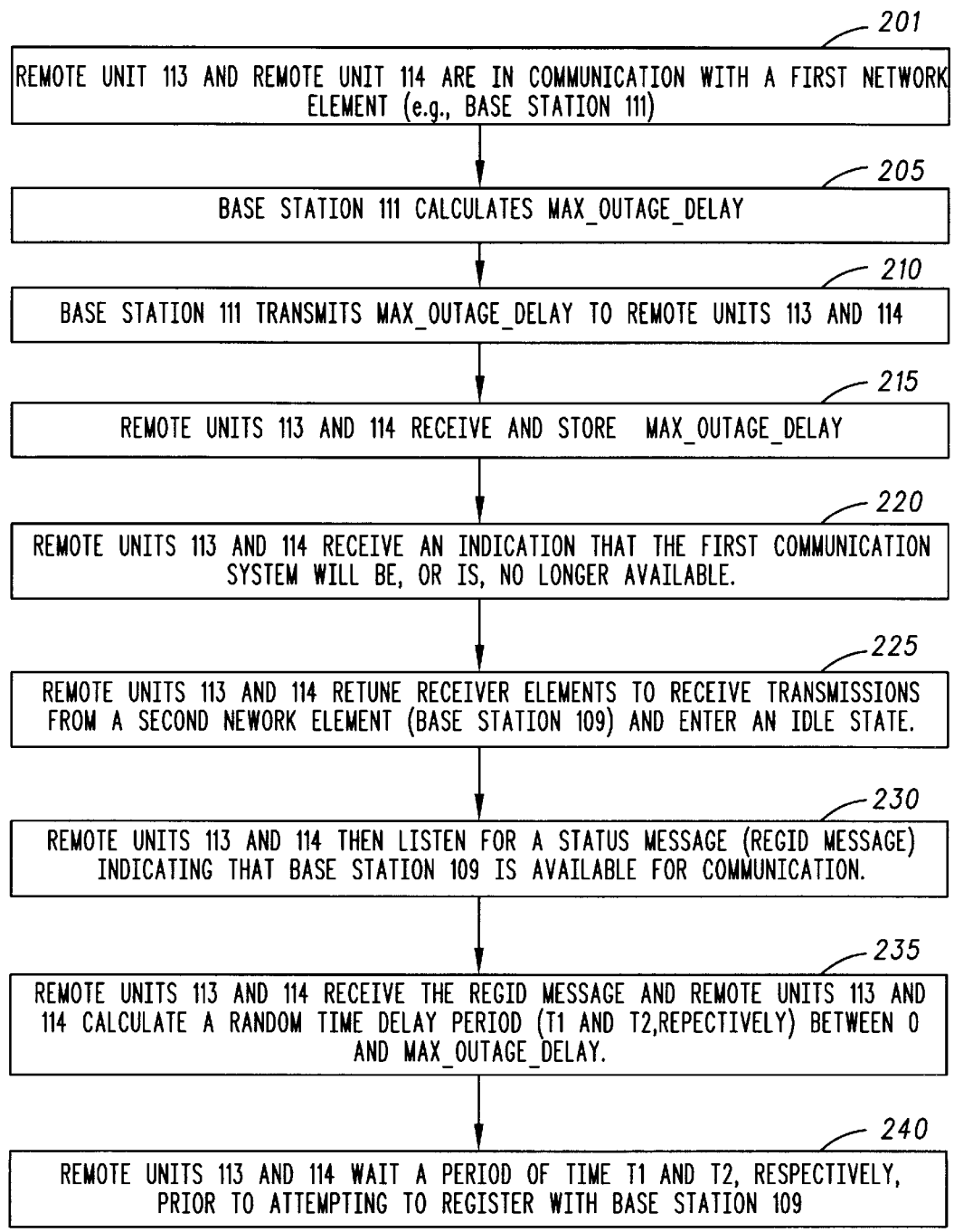
FIG. 2 is a logic-flow diagram for registering the remote unit of FIG. 1 in accordance with an aspect of the present invention.
Figure 3:
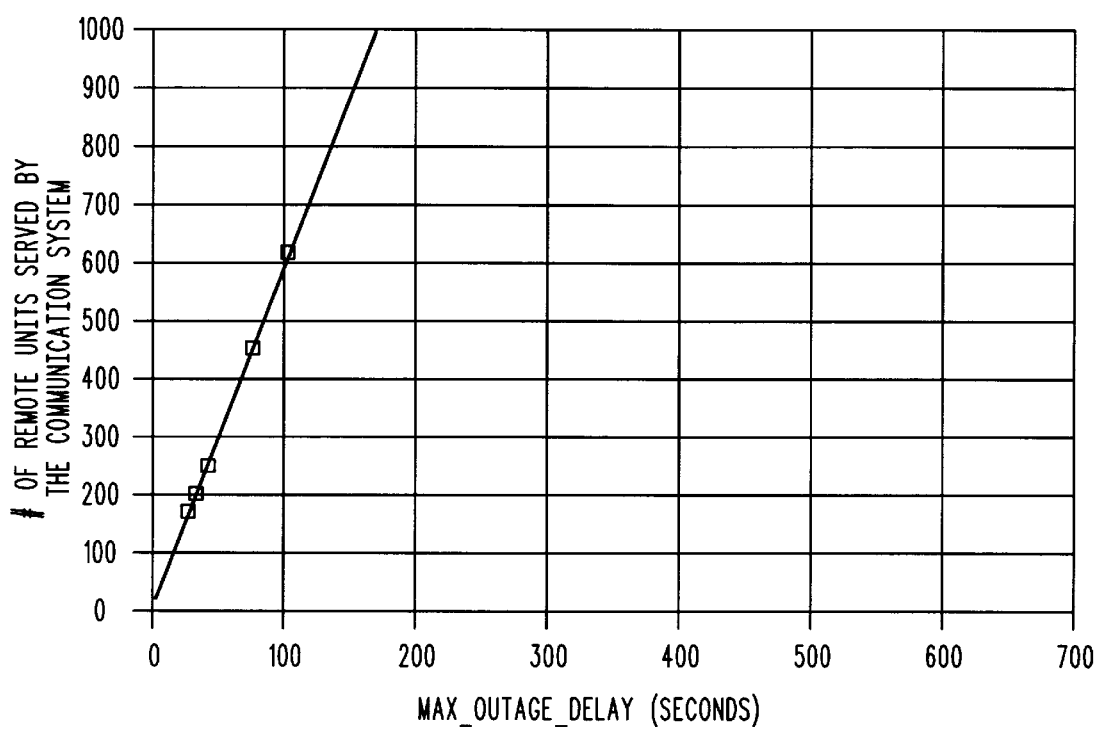
FIG. 3 illustrates derivation of a time delay parameter in accordance with the preferred embodiment of the present invention.

FIG. 2 is a logic-flow diagram of the preferred embodiment for registering the remote unit of FIG. 1. The logic flow begins at step 201 where remote unit 113 and remote unit 114 are in communication with a first network element (e.g., base station 111). In the preferred embodiment of the present invention, remote units 113 and 114 may be actively communicating with base station 111 utilizing a traffic channel, or may simply be in an idle state, actively monitoring a control channel. Next, at step 205, base station 111 calculates MAX_OUTAGE_DELAY. As discussed above, in the preferred embodiment of the present invention, MAX_OUTAGE_DELAY is a function of a number of remote units served by the communication system as shown in FIG. 3, however, in alternate embodiments of the present invention, MAX_OUTAGE_DELAY may be a constant number, preprogrammed within base station 111 by a system operator, or may be a function of other system parameters (e.g., a number of carriers within a cell, a number of effective traffic channels per carrier, an engineered grade of service, and erlangs per subscriber).

Continuing, at step 210, base station 111 transmits MAX_OUTAGE_DELAY to remote units 113 and 114. As discussed above, MAX_OUTAGE_DELAY is transmitted via a common control channel, however in alternate embodiments of the present invention, MAX_OUTAGE_DELAY may be transmitted to remote units 113 and 114 via other methods. More particularly, in the preferred embodiment of the present invention MAX_OUTAGE_DELAY is a five bit field transmitted within the reserved bit field of an *Extended System Parameters Message* as described in IS-95A section 7.7.3.2.13. At step 215 remote units 113 and 114 receive and store MAX_OUTAGE_DELAY. Next, at step 220, remote units 113 and 114 receive an indication that the first communication system will be, or is, no longer available. In response, remote units 113 and 114 retune receiver elements (step 225) to receive transmissions from a second network element (base station 109) and enter an idle state. Remote units 113 and 114 then listen for a status message (REGID message) (step 230) indicating that base station 109 is available for communication. At step 235 remote units 113 and 114 receive the REGID message and remote units 113 and 114 calculate a random time delay period (T1 and T2, respectively) between 0 and MAX_OUTAGE_DELAY. At step 240 remote units 113 and 114 wait a period of time T1 and T2, respectively, prior to attempting to register with base station 109.

It should be noted that in the preferred embodiment of the present invention, remote units 113 and 114 may register with base station 109 prior to their respective time periods expiring upon a call initiation. In other words, time delays T1 and T2 do not preclude any call from being initiated by remote units 113 and 114.

It is contemplated that the foregoing methods may be implemented in software, as programs, such as instruction sets, which may be written in any computer-readable language and stored in or on any computer-readable media and executed by one or more centrally or remotely located microprocessors using any available processing techniques. For example, at least a portion of the above-described method may be implemented in CBSC 103 via memory 127, processor 129 and instruction set 125, although it will be understood that a computer system and/or network in which the aspects of the present invention may be implemented may be configured in any suitable manner. One example of a suitable implementation of the various aspects of the present invention is described in detail in Appendix A, attached hereto.

The descriptions of the invention, the specific details, and the drawings mentioned above, are not meant to limit the scope of the present invention. For example, in addition to application to a cellular environment, the present invention may be applied to any system where simultaneous accessing may result in a system overload. And it is contemplated that different ranges of values may be utilized as desired. It is the intent of the inventors that various modifications can be made to the present invention without varying from the spirit and scope of the invention, and it is intended that all such modifications come within the scope of the following claims and their equivalents.

We claim:

1. In a remote communication unit responsive to a first wireless communication system and a second wireless communication system, a method for registering the remote communication unit, the method comprising:

receiving a time delay parameter from the first wireless communication system, the time delay parameter a function of a number of remote communication units in communication with the first wireless communication system;

storing the time delay parameter; and based on the time delay parameter, accessing the second wireless communication system, information associated with the first wireless communication system determining a time at which the remote communication unit accesses the second wireless communication system.

2. The method according to claim 1, wherein the remote communication unit comprises a mobile radiotelephone.

3. The method according to claim 1, wherein the first wireless communication system comprises a code division multiple access (CDMA) communication system.

4. The method according to claim 3, wherein the second wireless communication system comprises an analog communication system.

5. The method according to claim 1, wherein the time delay parameter is received on a forward control channel.

6. The method according to claim 1, wherein a value of the time delay parameter is less than or equal to two-hundred forty-eight seconds.

7. The method according to claim 1, wherein the time delay parameter is based on:

a number of remote communication units in communication with the first wireless communication system.

8. The method according to claim 1, further comprising the step of:

prior to the step of accessing, losing communication with the first communication system.

9. The method according to claim 8, wherein the step of losing communication comprises:

receiving a message from the first wireless communication system that the first wireless communication system is unable to continue communication.

10. The method according to claim 8, wherein the step of accessing further comprises the steps of:

waiting a period of time, the period of time determined by selecting a random number between zero and a value of the time delay parameter; and attempting to register with the second wireless communication system.

11. The method according to claim 10, wherein a granularity of the random number is less than or equal to one millisecond.

12. An instruction set stored on a computer-readable medium which, when loaded into at least one processor, performs a method for registering a plurality of remote communication units, the method comprising:

determining a number of the plurality of remote communication units in communication with a first wireless communication system;

based on the number, determining a time delay parameter, the time delay paraeter a function of a number of remote communication units in communication with the first wireless communication system;

transmitting the time delay parameter to at least some of the plurality of remote communication units; and based on the time delay parameter and a status of the first wireless communication system, registering at least some of the plurality of remote communication units at a second wireless communication system.

* * * * *